(12) United States Patent
De Laet et al.

(10) Patent No.: US 10,313,037 B2
(45) Date of Patent: Jun. 4, 2019

(54) ELECTRONIC DISPLAY REMOTE IMAGE VERIFICATION SYSTEM AND METHOD

(71) Applicant: Manufacturing Resources International, Inc., Alpharetta, GA (US)

(72) Inventors: Rick De Laet, Alpharetta, GA (US); William Dunn, Alpharetta, GA (US)

(73) Assignee: MANUFACTURING RESOURCES INTERNATIONAL, INC., Alpharetta, GA (US)

( * ) Notice: Subject to any disclaimer, the term of this patent is extended or adjusted under 35 U.S.C. 154(b) by 15 days.

(21) Appl. No.: 15/609,937

(22) Filed: May 31, 2017

(65) Prior Publication Data

US 2017/0346584 A1 Nov. 30, 2017

Related U.S. Application Data

(60) Provisional application No. 62/343,478, filed on May 31, 2016.

(51) Int. Cl.
*H04H 60/37* (2008.01)
*H04H 60/59* (2008.01)
(Continued)

(52) U.S. Cl.
CPC .......... *H04H 60/375* (2013.01); *H04H 60/59* (2013.01); *H04N 21/2407* (2013.01);
(Continued)

(58) Field of Classification Search
CPC ......... H04N 21/2407; H04N 21/44204; H04N 21/478; H04N 21/812; H04H 60/375; H04H 60/59
See application file for complete search history.

(56) References Cited

U.S. PATENT DOCUMENTS

| 4,271,410 A | 6/1981 | Crawford |
| 4,399,456 A | 8/1983 | Zalm |

(Continued)

FOREIGN PATENT DOCUMENTS

| CN | 1613264 A | 5/2005 |
| CN | 101777315 A | 7/2010 |

(Continued)

OTHER PUBLICATIONS ams AG, TCS3404, TCS3414, Digital Color Sensors, Apr. 2011, 41 pages, Texas Advanced Optoelectronic Solutions Inc. is now ams AG.

(Continued)

*Primary Examiner* — Alexander Q Huerta
(74) *Attorney, Agent, or Firm* — Standley Law Group LLP; Jeffrey S. Standley; Adam J. Smith

(57) ABSTRACT

A system and method for remotely verifying images shown on an electronic display is provided. A processor may direct a screen capture device to take a screen capture of the image currently shown on the electronic display. The screen capture may be stored on an electronic storage device and may be transferred to a networked database via a network connection device. A client may be able to access the screen captures through a user interface in connectivity with the networked database.

17 Claims, 5 Drawing Sheets

(51) Int. Cl.
*H04N 21/24* (2011.01)
*H04N 21/442* (2011.01)
*H04N 21/478* (2011.01)
*H04N 21/81* (2011.01)
*H04H 20/14* (2008.01)

(52) U.S. Cl.
CPC ..... *H04N 21/44204* (2013.01); *H04N 21/478* (2013.01); *H04N 21/812* (2013.01); *H04H 20/14* (2013.01)

(56) References Cited

U.S. PATENT DOCUMENTS

| | | |
|---|---|---|
| 4,456,910 A | 6/1984 | DiMassimo et al. |
| 4,571,616 A | 2/1986 | Haisma et al. |
| 4,593,978 A | 6/1986 | Mourey et al. |
| 4,753,519 A | 6/1988 | Miyatake |
| 5,029,982 A | 7/1991 | Nash |
| 5,049,987 A | 9/1991 | Hoppenstein |
| 5,081,523 A | 1/1992 | Frazier |
| 5,088,806 A | 2/1992 | McCartney et al. |
| 5,115,229 A | 5/1992 | Shalit |
| 5,162,645 A | 11/1992 | Wagensonner et al. |
| 5,162,785 A | 11/1992 | Fagard |
| 5,351,201 A | 9/1994 | Harshbarger, Jr. et al. |
| 5,402,141 A | 3/1995 | Haim et al. |
| 5,565,894 A | 10/1996 | Bates et al. |
| 5,656,824 A | 8/1997 | den Boer et al. |
| 5,663,952 A | 9/1997 | Gentry, Jr. |
| 5,694,141 A | 12/1997 | Chee |
| 5,751,346 A | 5/1998 | Dozier et al. |
| 5,835,074 A | 11/1998 | Didier et al. |
| 5,886,731 A | 3/1999 | Ebisawa |
| 6,027,222 A | 2/2000 | Oki et al. |
| 6,032,126 A | 2/2000 | Kaehler |
| 6,055,012 A | 4/2000 | Haskell et al. |
| 6,075,556 A | 6/2000 | Urano et al. |
| 6,091,777 A | 7/2000 | Guetz et al. |
| 6,094,457 A | 7/2000 | Linzer et al. |
| 6,100,906 A | 8/2000 | Asaro et al. |
| 6,153,985 A | 11/2000 | Grossman |
| 6,192,083 B1 | 2/2001 | Linzer et al. |
| 6,259,492 B1 | 7/2001 | Imoto et al. |
| 6,292,157 B1 | 9/2001 | Greene et al. |
| 6,292,228 B1 | 9/2001 | Cho |
| 6,297,859 B1 | 10/2001 | George |
| 6,326,934 B1 | 12/2001 | Kinzie |
| 6,359,390 B1 | 3/2002 | Nagai |
| 6,392,727 B1 | 5/2002 | Larson et al. |
| 6,417,900 B1 | 7/2002 | Shin et al. |
| 6,421,103 B2 | 7/2002 | Yamaguchi |
| 6,421,694 B1 | 7/2002 | Nawaz et al. |
| 6,428,198 B1 | 8/2002 | Saccomanno et al. |
| 6,536,041 B1 | 3/2003 | Knudson et al. |
| 6,546,294 B1 | 4/2003 | Kelsey et al. |
| 6,553,336 B1 | 4/2003 | Johnson et al. |
| 6,587,525 B2 | 7/2003 | Jeong et al. |
| 6,642,666 B1 | 11/2003 | St-Germain |
| 6,674,463 B1 | 1/2004 | Just et al. |
| 6,690,726 B1 | 2/2004 | Yavits et al. |
| 6,697,100 B2 | 2/2004 | Tatsuzawa |
| 6,698,020 B1 | 2/2004 | Zigmond et al. |
| 6,712,046 B2 | 3/2004 | Nakamichi |
| 6,812,851 B1 | 11/2004 | Dukach et al. |
| 6,820,050 B2 | 11/2004 | Simmon et al. |
| 6,825,899 B2 | 11/2004 | Kobayashi |
| 6,850,209 B2 | 2/2005 | Mankins et al. |
| 6,996,460 B1 | 2/2006 | Krahnstoever et al. |
| 7,038,186 B2 | 5/2006 | De Brabander et al. |
| 7,057,590 B2 | 6/2006 | Lim et al. |
| 7,103,852 B2 | 9/2006 | Kairis, Jr. |
| 7,136,415 B2 | 11/2006 | Yun et al. |
| 7,174,029 B2 | 2/2007 | Agostinelli et al. |
| 7,304,638 B2 | 12/2007 | Murphy |
| 7,307,614 B2 | 12/2007 | Vinn |
| 7,319,862 B1 | 1/2008 | Lincoln et al. |
| 7,358,851 B2 | 4/2008 | Patenaude et al. |
| 7,385,593 B2 | 6/2008 | Krajewski et al. |
| 7,391,811 B2 | 6/2008 | Itoi et al. |
| 7,480,042 B1 | 1/2009 | Phillips et al. |
| 7,518,600 B2 | 4/2009 | Lee |
| 7,573,458 B2 | 8/2009 | Dunn |
| 7,581,094 B1 | 8/2009 | Apostolopoulos et al. |
| 7,614,065 B2 | 11/2009 | Weissmueller et al. |
| 7,636,927 B2 | 12/2009 | Zigmond et al. |
| 7,669,757 B1 | 3/2010 | Crews et al. |
| 7,714,834 B2 | 5/2010 | Dunn |
| 7,764,280 B2 | 7/2010 | Shiina |
| 7,810,114 B2 | 7/2010 | Flickinger et al. |
| 7,813,694 B2 | 10/2010 | Fishman et al. |
| 7,825,991 B2 | 11/2010 | Enomoto |
| 7,924,263 B2 | 4/2011 | Dunn |
| 7,937,724 B2 | 5/2011 | Clark et al. |
| 7,988,849 B2 | 8/2011 | Biewer et al. |
| 8,130,836 B2 | 3/2012 | Ha |
| 8,212,921 B2 | 7/2012 | Yun |
| 8,218,812 B2 | 7/2012 | Sugimoto et al. |
| 8,242,974 B2 | 8/2012 | Yamazaki et al. |
| 8,350,799 B2 | 1/2013 | Wasinger et al. |
| 8,400,570 B2 | 3/2013 | Dunn et al. |
| 8,417,376 B1 | 4/2013 | Smolen |
| 8,441,574 B2 | 5/2013 | Dunn et al. |
| 8,605,121 B2 | 12/2013 | Chu et al. |
| 8,689,343 B2 | 4/2014 | De Laet |
| 8,704,752 B2 | 4/2014 | Wasinger et al. |
| 8,823,630 B2 | 9/2014 | Roberts et al. |
| 9,026,686 B2 | 5/2015 | Dunn et al. |
| 9,031,872 B1 | 5/2015 | Foster |
| 10,068,237 B2 * | 9/2018 | Simske ................... G09C 5/00 |
| 2001/0019454 A1 | 9/2001 | Tadic-Galeb et al. |
| 2002/0018522 A1 | 2/2002 | Wiedenmann |
| 2002/0026354 A1 | 2/2002 | Shoji et al. |
| 2002/0112026 A1 | 8/2002 | Fridman et al. |
| 2002/0120721 A1 | 8/2002 | Eilers et al. |
| 2002/0147648 A1 | 10/2002 | Fadden et al. |
| 2002/0154138 A1 | 10/2002 | Wada et al. |
| 2002/0163513 A1 | 11/2002 | Tsuji |
| 2002/0164962 A1 | 11/2002 | Mankins et al. |
| 2002/0190972 A1 | 12/2002 | Ven de Van |
| 2002/0194365 A1 | 12/2002 | Jammes |
| 2002/0194609 A1 | 12/2002 | Tran |
| 2003/0030733 A1 * | 2/2003 | Seaman ............ G06F 17/30017 348/239 |
| 2003/0031128 A1 | 2/2003 | Kim et al. |
| 2003/0039312 A1 | 2/2003 | Horowitz et al. |
| 2003/0061316 A1 | 3/2003 | Blair et al. |
| 2003/0098881 A1 | 5/2003 | Nolte et al. |
| 2003/0115591 A1 * | 6/2003 | Weissmueller, Jr. ....... G06Q 30/0241 725/22 |
| 2003/0117428 A1 | 6/2003 | Li et al. |
| 2003/0117714 A1 | 6/2003 | Nakamura et al. |
| 2003/0125892 A1 | 7/2003 | Edge |
| 2003/0161354 A1 | 8/2003 | Bader et al. |
| 2003/0177269 A1 | 9/2003 | Robinson et al. |
| 2003/0192060 A1 | 10/2003 | Levy |
| 2003/0196208 A1 | 10/2003 | Jacobson |
| 2003/0202605 A1 | 10/2003 | Hazra et al. |
| 2003/0227428 A1 | 12/2003 | Nose |
| 2004/0012722 A1 | 1/2004 | Alvarez |
| 2004/0114041 A1 | 6/2004 | Doyle et al. |
| 2004/0138840 A1 | 7/2004 | Wolfe |
| 2004/0194131 A1 | 9/2004 | Ellis et al. |
| 2004/0207738 A1 | 10/2004 | Wacker |
| 2004/0252187 A1 | 12/2004 | Alden |
| 2005/0005302 A1 | 1/2005 | Zigmond et al. |
| 2005/0012734 A1 | 1/2005 | Johnson et al. |
| 2005/0046951 A1 | 3/2005 | Sugihara et al. |
| 2005/0071252 A1 | 3/2005 | Henning et al. |
| 2005/0123001 A1 | 6/2005 | Craven et al. |
| 2005/0127796 A1 | 6/2005 | Olesen et al. |
| 2005/0134525 A1 | 6/2005 | Tanghe et al. |
| 2005/0134526 A1 | 6/2005 | Willem et al. |
| 2005/0184983 A1 | 8/2005 | Brabander et al. |

(56) References Cited

U.S. PATENT DOCUMENTS

| | | |
|---|---|---|
| 2005/0188402 A1 | 8/2005 | de Andrade et al. |
| 2005/0195330 A1 | 9/2005 | Zacks et al. |
| 2005/0216939 A1 | 9/2005 | Corbin |
| 2005/0253699 A1 | 11/2005 | Madonia |
| 2005/0289061 A1 | 12/2005 | Kulakowski et al. |
| 2005/0289588 A1 | 12/2005 | Kinnear |
| 2006/0087521 A1 | 4/2006 | Chu et al. |
| 2006/0150222 A1 | 7/2006 | McCafferty et al. |
| 2006/0160614 A1 | 7/2006 | Walker et al. |
| 2006/0214904 A1 | 9/2006 | Kimura et al. |
| 2006/0215044 A1 | 9/2006 | Masuda et al. |
| 2006/0244702 A1 | 11/2006 | Yamazaki et al. |
| 2007/0047808 A1 | 3/2007 | Choe et al. |
| 2007/0094620 A1 | 4/2007 | Park |
| 2007/0127569 A1 | 6/2007 | Hatalker |
| 2007/0152949 A1 | 7/2007 | Sakai |
| 2007/0154060 A1 | 7/2007 | Sun |
| 2007/0157260 A1 | 7/2007 | Walker |
| 2007/0164932 A1 | 7/2007 | Moon |
| 2007/0165955 A1 | 7/2007 | Hwang et al. |
| 2007/0168539 A1 | 7/2007 | Day |
| 2007/0200513 A1 | 8/2007 | Ha et al. |
| 2007/0211179 A1 | 9/2007 | Hector et al. |
| 2007/0220544 A1* | 9/2007 | Nash-Putnam ........ H04H 20/14 725/32 |
| 2007/0247594 A1 | 10/2007 | Tanaka |
| 2007/0274400 A1 | 11/2007 | Murai et al. |
| 2007/0286107 A1 | 12/2007 | Singh et al. |
| 2008/0008471 A1 | 1/2008 | Dress |
| 2008/0017422 A1 | 1/2008 | Carro |
| 2008/0018584 A1 | 1/2008 | Park et al. |
| 2008/0028059 A1 | 1/2008 | Shin et al. |
| 2008/0037783 A1 | 2/2008 | Kim et al. |
| 2008/0055247 A1 | 3/2008 | Boillot |
| 2008/0074372 A1 | 3/2008 | Baba et al. |
| 2008/0093443 A1 | 4/2008 | Barcelou |
| 2008/0104631 A1 | 5/2008 | Krock et al. |
| 2008/0106527 A1 | 5/2008 | Cornish et al. |
| 2008/0112601 A1 | 5/2008 | Warp |
| 2008/0119237 A1 | 5/2008 | Kim |
| 2008/0143637 A1 | 6/2008 | Sunahara et al. |
| 2008/0163291 A1 | 7/2008 | Fishman et al. |
| 2008/0170028 A1 | 7/2008 | Yoshida |
| 2008/0174522 A1 | 7/2008 | Cho et al. |
| 2008/0201208 A1 | 8/2008 | Tie et al. |
| 2008/0231604 A1 | 9/2008 | Peterson |
| 2008/0232478 A1 | 9/2008 | Teng et al. |
| 2008/0246871 A1 | 10/2008 | Kupper et al. |
| 2008/0250445 A1* | 10/2008 | Zigmond .............. G06Q 30/02 725/32 |
| 2008/0266331 A1 | 10/2008 | Chen et al. |
| 2008/0272999 A1 | 11/2008 | Kurokawa et al. |
| 2008/0278432 A1 | 11/2008 | Ohshima |
| 2008/0278455 A1 | 11/2008 | Atkins et al. |
| 2008/0303918 A1 | 12/2008 | Keithley |
| 2008/0313046 A1 | 12/2008 | Denenburg et al. |
| 2009/0036190 A1 | 2/2009 | Brosnan et al. |
| 2009/0058845 A1 | 3/2009 | Fukuda et al. |
| 2009/0102914 A1 | 4/2009 | Collar et al. |
| 2009/0102973 A1 | 4/2009 | Harris |
| 2009/0109165 A1 | 4/2009 | Park et al. |
| 2009/0128867 A1 | 5/2009 | Edge |
| 2009/0164615 A1 | 6/2009 | Akkanen |
| 2009/0182917 A1 | 7/2009 | Kim |
| 2009/0219295 A1 | 9/2009 | Reijnaerts |
| 2009/0251602 A1 | 10/2009 | Williams et al. |
| 2009/0254439 A1 | 10/2009 | Dunn |
| 2009/0260028 A1 | 10/2009 | Dunn et al. |
| 2009/0267866 A1 | 10/2009 | Reddy et al. |
| 2009/0273568 A1 | 11/2009 | Milner |
| 2009/0289968 A1 | 11/2009 | Yoshida |
| 2009/0313125 A1 | 12/2009 | Roh et al. |
| 2009/0315867 A1 | 12/2009 | Sakamoto et al. |
| 2010/0039440 A1 | 2/2010 | Tanaka et al. |
| 2010/0039696 A1 | 2/2010 | de Groot et al. |
| 2010/0054552 A1* | 3/2010 | Abebe ................... G06F 21/32 382/124 |
| 2010/0060550 A1 | 3/2010 | McGinn et al. |
| 2010/0083305 A1 | 4/2010 | Acharya et al. |
| 2010/0104003 A1 | 4/2010 | Dunn et al. |
| 2010/0109974 A1 | 5/2010 | Dunn et al. |
| 2010/0177157 A1 | 7/2010 | Berlage |
| 2010/0177158 A1 | 7/2010 | Walter |
| 2010/0188342 A1 | 7/2010 | Dunn |
| 2010/0194861 A1 | 8/2010 | Hoppenstein |
| 2010/0195865 A1 | 8/2010 | Luff |
| 2010/0198983 A1 | 8/2010 | Monroe et al. |
| 2010/0231563 A1 | 9/2010 | Dunn et al. |
| 2010/0238299 A1 | 9/2010 | Dunn et al. |
| 2010/0242081 A1 | 9/2010 | Dunn et al. |
| 2010/0253613 A1 | 10/2010 | Dunn et al. |
| 2010/0253778 A1 | 10/2010 | Lee et al. |
| 2011/0012856 A1 | 1/2011 | Maxwell et al. |
| 2011/0047567 A1 | 2/2011 | Zigmond et al. |
| 2011/0069018 A1 | 3/2011 | Atkins et al. |
| 2011/0074803 A1 | 3/2011 | Kerofsky |
| 2011/0078536 A1 | 3/2011 | Han et al. |
| 2011/0102630 A1 | 5/2011 | Rukes |
| 2011/0181693 A1 | 7/2011 | Lee et al. |
| 2011/0194730 A1* | 8/2011 | Rhoads ................. G06F 21/10 382/100 |
| 2011/0225859 A1 | 9/2011 | Safavi |
| 2011/0273482 A1 | 11/2011 | Massart et al. |
| 2012/0075362 A1 | 3/2012 | Ichioka et al. |
| 2012/0182278 A1 | 7/2012 | Ballestad |
| 2012/0188262 A1 | 7/2012 | Rabii |
| 2012/0203872 A1 | 8/2012 | Luby et al. |
| 2012/0243727 A1* | 9/2012 | Hwang ................. G06T 1/0085 382/100 |
| 2012/0302343 A1 | 11/2012 | Hurst et al. |
| 2013/0103504 A1* | 4/2013 | Srinivasan .......... G06Q 30/0241 705/14.68 |
| 2013/0110565 A1* | 5/2013 | Means, Jr. ............. G06Q 10/06 705/7.11 |
| 2013/0162908 A1 | 6/2013 | Son et al. |
| 2013/0347019 A1* | 12/2013 | Herlein .............. H04N 21/2407 725/22 |
| 2014/0043302 A1 | 2/2014 | Barnes |
| 2014/0082646 A1* | 3/2014 | Sandland ......... H04N 21/44008 725/14 |
| 2014/0139116 A1 | 5/2014 | Reed |
| 2014/0193084 A1* | 7/2014 | Mahinkanda ........ G06K 9/6202 382/218 |
| 2014/0214525 A1* | 7/2014 | Tsai .................. G06Q 30/0241 705/14.41 |
| 2014/0333541 A1 | 11/2014 | Lee et al. |
| 2014/0375704 A1 | 12/2014 | Bi et al. |
| 2015/0070340 A1 | 3/2015 | Trachtenberg et al. |
| 2015/0106831 A1* | 4/2015 | Todd ................... H04N 17/004 725/22 |
| 2015/0281774 A1* | 10/2015 | Atkin ............... H04N 21/64322 725/14 |
| 2015/0312488 A1 | 10/2015 | Kostrzewa et al. |
| 2016/0014103 A1 | 1/2016 | Masters et al. |
| 2016/0034240 A1 | 2/2016 | Kreiner et al. |
| 2016/0063954 A1 | 3/2016 | Ryu |
| 2016/0125777 A1 | 5/2016 | Knepper et al. |
| 2016/0134841 A1* | 5/2016 | Round ................. H04N 17/04 348/148 |
| 2016/0293206 A1 | 10/2016 | Dunn |
| 2016/0335705 A1 | 11/2016 | Williams et al. |
| 2016/0358357 A1 | 12/2016 | Dunn et al. |
| 2017/0111486 A1 | 4/2017 | Bowers et al. |

FOREIGN PATENT DOCUMENTS

| | | |
|---|---|---|
| CN | 102246196 A | 11/2011 |
| EP | 0313331 A2 | 4/1989 |
| EP | 1640337 A2 | 3/2006 |
| EP | 2332120 A2 | 6/2011 |
| EP | 2401736 A2 | 1/2012 |
| EP | 2401869 A2 | 1/2012 |
| ID | 0514488 A | 9/2011 |

(56) References Cited

FOREIGN PATENT DOCUMENTS

| | | |
|---|---|---|
| JP | 2002064842 A | 2/2002 |
| JP | 2002209230 A | 7/2002 |
| JP | 2002366121 A | 12/2002 |
| JP | 2005236469 A | 9/2005 |
| JP | 2006184859 A | 7/2006 |
| JP | 2008034841 A | 2/2008 |
| JP | 2008165055 A | 7/2008 |
| JP | 2009009422 A | 1/2009 |
| KR | 20000021499 A | 4/2000 |
| KR | 20020072633 A | 9/2002 |
| TW | 200403940 A | 3/2004 |
| WO | WO9608892 A1 | 3/1996 |
| WO | WO2006089556 A1 | 8/2006 |
| WO | WO2006111689 A1 | 10/2006 |
| WO | WO2009004574 A1 | 1/2009 |
| WO | WO2010037104 A2 | 4/2010 |
| WO | WO2010085783 A1 | 7/2010 |
| WO | WO2010085784 A2 | 7/2010 |
| WO | WO2010094039 A2 | 8/2010 |
| WO | WO2010099178 A2 | 9/2010 |
| WO | WO2010099194 A2 | 9/2010 |
| WO | WO2011026186 A1 | 3/2011 |
| WO | WO2011035370 A1 | 3/2011 |
| WO | WO2011044640 A1 | 4/2011 |
| WO | WO2011060487 A1 | 5/2011 |
| WO | WO2011143720 A1 | 11/2011 |
| WO | WO2016000546 A1 | 1/2016 |

OTHER PUBLICATIONS

Analog Devices, ADV212: JPEG 2000 Video Codec, http://www.analog.com/en/audiovideo-products/video-compression/ADV212/products/pr . . . , accessed Oct. 15, 2008, 2 pages.

Analog Devices, Inc., JPEG 2000 Video Codec ADV212, 2006, 44 pages.

Photo Research, Inc., PR-650 SpectraScan Colorimeter, 1999, 2 pages.

Teravision Corp, LCD-TV Panel Control Board Specification, Nov. 2007, 24 pages.

Texas Advanced Optoelectronic Solutions Inc., TCS230 Programmable Color Light-To-Frequency Converter, Dec. 2007, 12 pages.

Texas Advanced Optoelectronic Solutions Inc., TCS3404CS, TCS3414CS Digital Color Light Sensors, Feb. 2009, 38 pages.

Wikipedia, Color rendering index, https://en.wikipedia.org/wiki/Color_rendering_index, accessed Aug. 25, 2016, 13 pages.

Wikipedia, Gamut, https://en.wikipedia.org/wiki/Gamut, accessed Aug. 25, 2016, 8 pages.

Wikipedia, Gradient-index optics, https://en.wikipedia.org/wiki/Gradient-index_optics, accessed Aug. 25, 2016, 5 pages.

* cited by examiner

ELECTRONIC DISPLAY REMOTE IMAGE VERIFICATION SYSTEM AND METHOD

This application claims the benefit of U.S. Provisional Patent Application No. 62/343,478 filed May 31, 2016. The disclosure of which is hereby incorporated by reference in their entirety.

TECHNICAL FIELD

Embodiments of the present invention generally relate to screen capture systems and methods for electronic displays.

BACKGROUND

Electronic displays are sometimes used to display advertising images. The electronic displays may be placed in a public location so as to be viewed by a large audience. Individuals and companies generally pay a fee to have their advertising images displayed periodically on these electronic displays.

SUMMARY OF THE INVENTIVE CONCEPT

Exemplary embodiments may comprise an electronic display electrically connected with a timing and control board (TCON) which is electrically connected with a video player. A processor may direct the video player to play certain static images or video images on the electronic display. In one embodiment, the processor may check to see if the client for the currently displayed (advertising) image has requested an image validation and/or verification. If the client has, the processor may direct a screen capture device to take a static screen shot or video segment clip (hereinafter also collectively a "screen capture") of the currently displayed image or video. The screen capture may be time and date stamped and stored in a local electronic storage device at the electronic display or a networked database remote from the electronic display. In exemplary embodiments, the screen capture may be compressed before being stored to limit memory and network usage. The electronic storage device may be connected to a communications network via a network connection device and may periodically transmit the screen captures to the client or make the screen captures accessible on a user interface.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
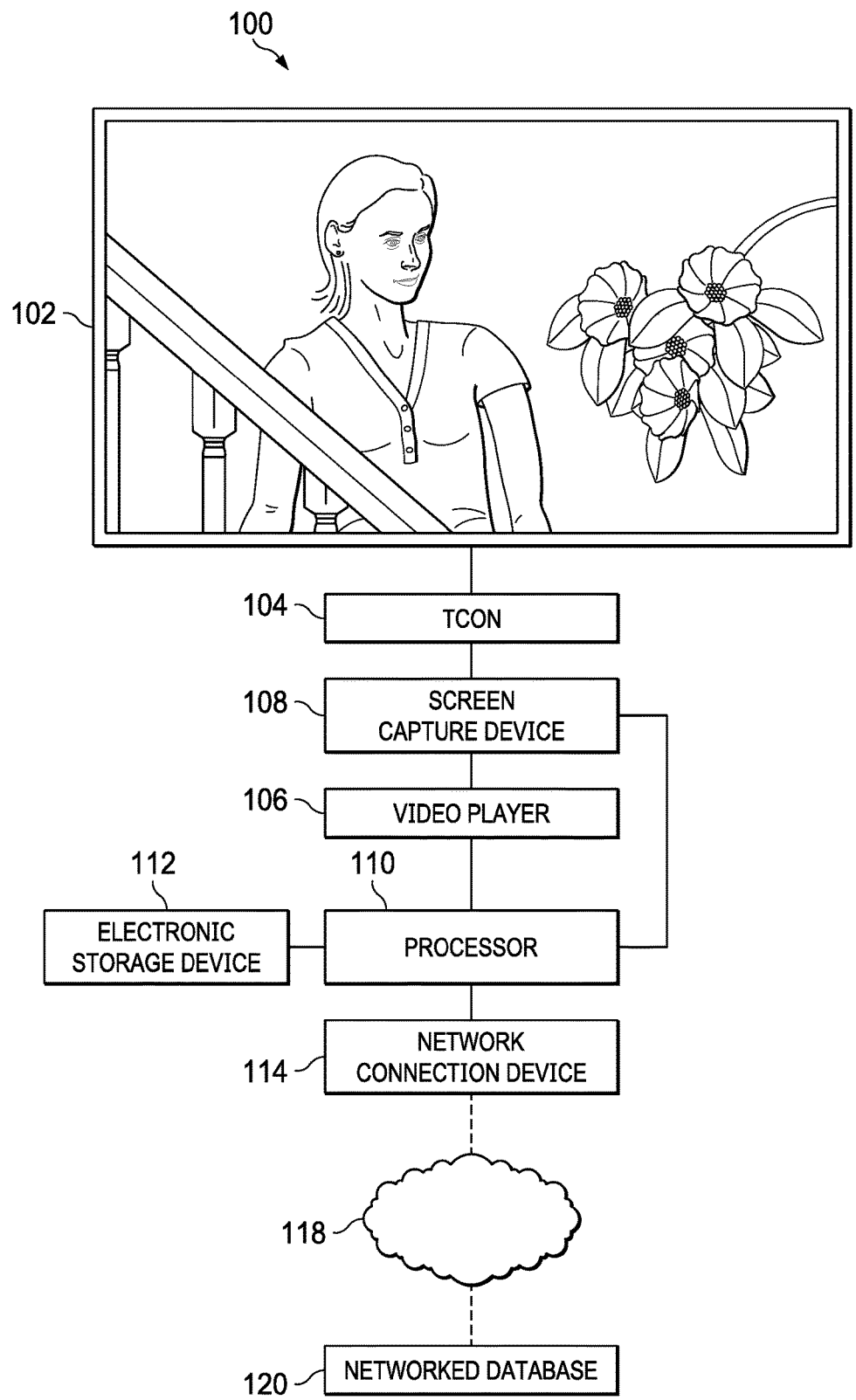
FIG. 1 is a simplified block diagram of an exemplary display assembly having a screen capture device.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is well known that electronic displays can display both static images as well as video. As used herein, the term "image" will be used to represent both static images and video, with respect to what is being shown on the electronic display. The validation system described herein is expressly used with both static images as well as video.

FIG. 1 An image validation system 100 may comprise an electronic display 102 that is in electrical connection with a TCON 104. The TCON 104 may be in electrical connection with a screen capture device 108. The screen capture device 108 may be comprised of a Field-Programmable Gate Array (FPGA), though such is not required. The screen capture device 108 may be in electrical connection with a video player 106 and a processor 110. In this embodiment, the screen capture device 108 is positioned downstream of the video player 106 and upstream of the TCON 104. The processor 110 may be any type of processor, such as but not limited to, one having 300 MHz and 64 MB RAM capabilities. The processor 110 may direct the video player 106 to play an image or video (herein referred to simply as 'image'). The processor 110 may determine which image to be played based on pre-programmed instructions. The instructions may also include, for example without limitation, the duration, order, frequency, timing, and the like of play for the images. The instructions may also include settings for the electronic display 102 while select images are being displayed including, for example without limitation, brightness, color, warmth, contrast, and the like. The instructions may be changed at any time. In exemplary embodiments, the instructions may be given by a separate processor.

The processor 110 may monitor the image that is currently being displayed and may check to see if the client who submitted the image requested an image validation. If the client did not request an image validation, the image validation system 100 may continue to operate normally. If the client did request an image validation, the processor 110 may direct the screen capture device 108 to take a screen capture of the displayed image. If the image is a video, the screen capture device 108 may take a static image screen shot of the video or may store a clip of the displayed advertising video. If the image is a static image, the screen capture device 108 may take a screen shot of the displayed image. The screen capture may be stored in an electronic storage device 112 that is electrically connected to the processor 110 and located locally to the electronic display 102 or transmitted through a network connection device 114 to a networked database 120 which may be located remotely.

In exemplary embodiments, a screen capture may be taken of every displayed image and the processor 110 may determine whether to keep or discard the screen capture based on whether or not the client has requested an image validation. In other exemplary embodiments, a screen capture may be taken periodically, for example without limitation, every 5 seconds. The screen capture device 108 may include a checksum or other confirmation data in the header or other portion of the screen capture file. In this way, if the same image is currently being displayed as was previously captured, the processor 110 may direct the screen capture to not be stored. In still other exemplary embodiments, a screen capture may be taken of every displayed image and stored for a period of time before being automatically deleted.

The screen capture device 108 may include a time and date stamp associated with the screen capture. The instructions to take and store the screen captures may be given by the processor 110 or may be given by a remote processor or application, such as but not limited to, an application installed on the networked database 120.

The network connection device 114 may be in communication with a communications network 118 such as, but not limited to, an intranet, internet, cellular network, the world wide web, or the like whereby the screen captures may be periodically transmitted to the client. The transmission may be by email, picture message, upload, or the like. In other exemplary embodiments, the screen capture data stored on the electronic storage device 112 or the networked database 120 may be made available to the client by way of a user interface 300 as illustrated and discussed with regards to FIG. 3.

In exemplary embodiments, the screen capture may be compressed and/or reformatted by the screen capture device 108 prior to being stored and/or transmitted on the communications network 118. This may limit memory and network usage. In exemplary embodiments, the compression may be at a 600:1 ratio. For example, but not to serve as a limitation, the native input format may be 3840×2160 RGB888 BMP format and the captured image may be compressed to 240×135 resolution and reformatted to a RGB565 PNG format. In other exemplary embodiments, the native input format may be 1920×1080 RGB888 BMP format and the captured image may be compressed to 240×135 resolution and reformatted to RGB565 PNG format. It is notable that these are merely exemplary, any size and format native input, any compression ratio, and any output sizes and formats are contemplated.

Figure 2:
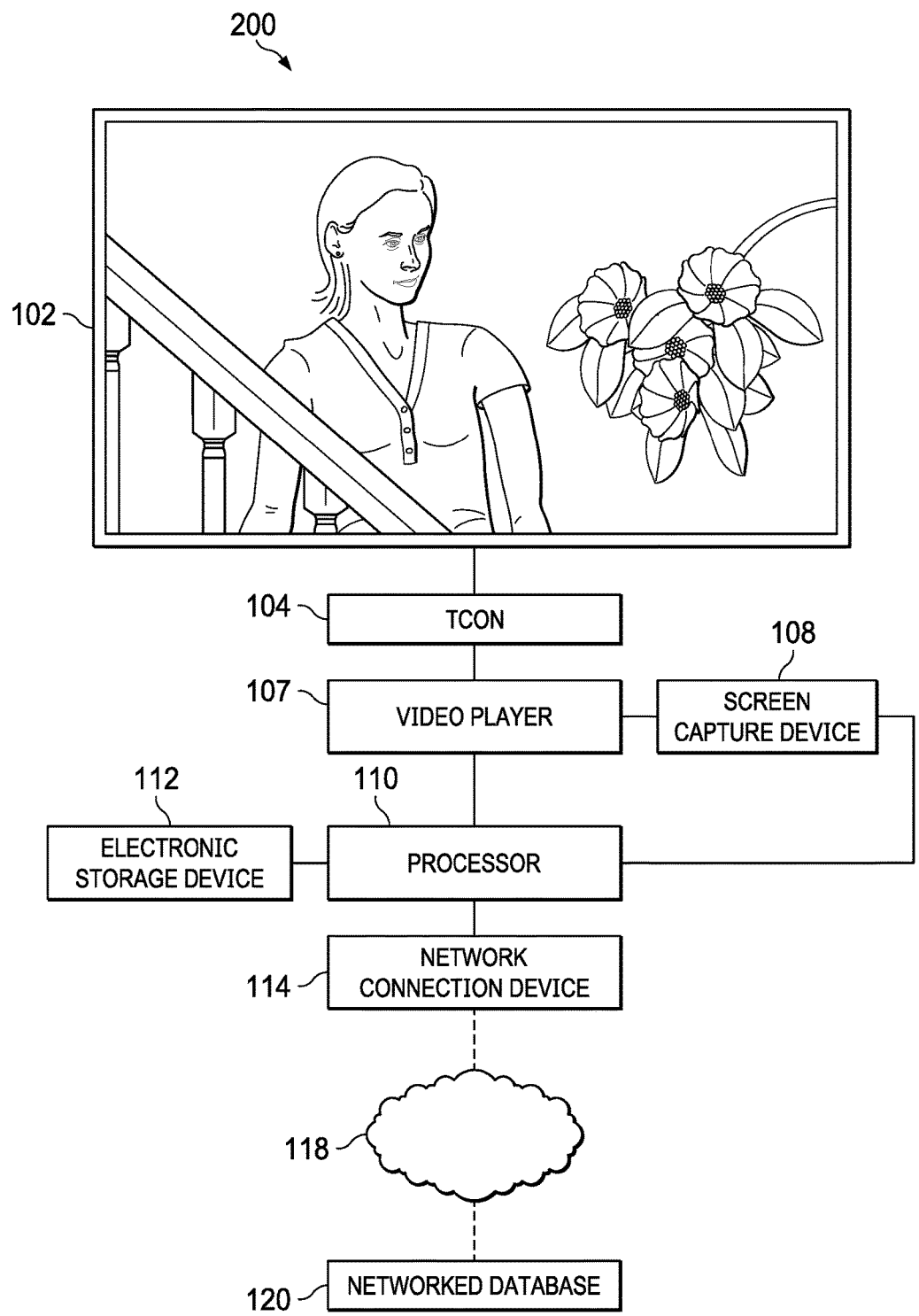
FIG. 2 is a simplified block diagram of another exemplary display assembly having a screen capture device.

FIG. 2 In another exemplary embodiment, the image validation system 200 may instead comprise a video player 107 having two video outputs. A first video output which is in electrical connection with the TCON 104 and a second video output which is in electrical connection with the screen capture device 108. In this embodiment, the output of the video player 106, namely the advertising images, may be transmitted to both the TCON 104 and the screen capture device 108. The screen capture may be stored in an electronic storage device 112 that is electrically connected to the processor 110 or transmitted through a network connection device 114 to a networked database 120 which may be located remotely. The electronic storage device 112 or the networked database 120 may make the screen capture data available to the client by way of the user interface 300, as illustrated and discussed with regards to FIG. 3.

Figure 3:
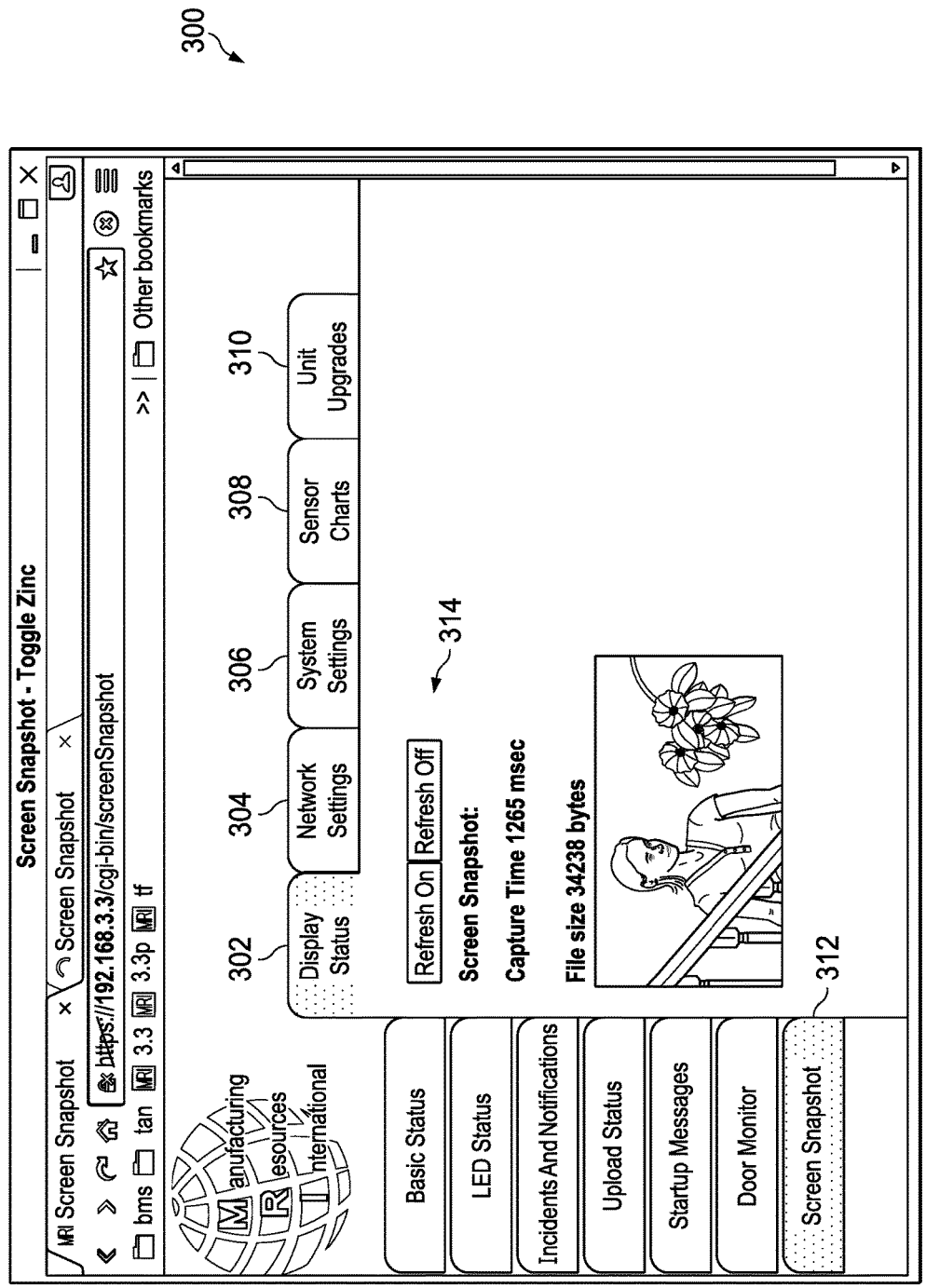
FIG. 3 is an exemplary user interface for use with the display assembly of either FIG. 1 or FIG. 2.

FIG. 3 In exemplary embodiments, the user interface 300 is a website. In other exemplary embodiments the user interface 300 is an Application Program Interface (API) configured to be utilized with another website or program. In still other exemplary embodiments, the user interface 300 may be a Graphical User Interface (GUI). Regardless, the user interface 300 may be in communication with electronic storage device 112 or the networked database 120 and may be configured to make the stored screen capture data available for viewing.

The user interface 300 may comprise a link 312 for viewing the screen capture data. Options to view the display status 302, network settings 304, system settings 306, sensor charts 308, unit upgrades 310, and the like may be made available after selecting the link 312 or accessing the user interface 300. The display status 302 option may provide a refresh feature 314 wherein a new screen capture may be taken. Information about the screen capture may be displayed including the time and date information and a preview of the screen capture. The full screen capture data file may be made available for download or viewing. Additionally, all of the stored screen captures may be available.

The network settings 304 option may permit the user to adjust settings and options related to the communications network 118, the network connection device 114, and or the networked database 120. The system settings 306 option may permit the user to adjust setting and options related to the processor 110 such as, but not limited to, what images are displayed, the duration, order, and timing of the images, when screen captures should be taken, time and date stamping, and the like. The system setting 306 option may also permit the user to adjust the settings and options related to the electronic display 102 such as, but not limited to, the brightness, contrast, color, and the like. The sensor charts 308 option may allow the user to view when the screen captures were taken and view the screen captures stored on the electronic storage device 112 or the networked database 118. The unit upgrades 310 option may provide the user with additional information regarding options, upgrades, add-ons, and the like for the image validation system 100.

In exemplary embodiments, the user interface 300 may be in communication with several image validation systems 100 or 200 so as to provide image validation for a plurality of image validation systems 100 or 200 simultaneously. The user interface 300 may display the status and other information regarding each of the image validation systems 100 or 200. The user interface 300 may additionally display or provide a means for accessing the current or stored screen captures for each of the image validation systems 100 or 200.

A person having skill in the arts will recognize that the look and feel, layout, options, and the like of the user interface 300 are merely exemplary and are not intended to be limiting. Any look and feel, layout, options, and the like are contemplated.

Figure 4:
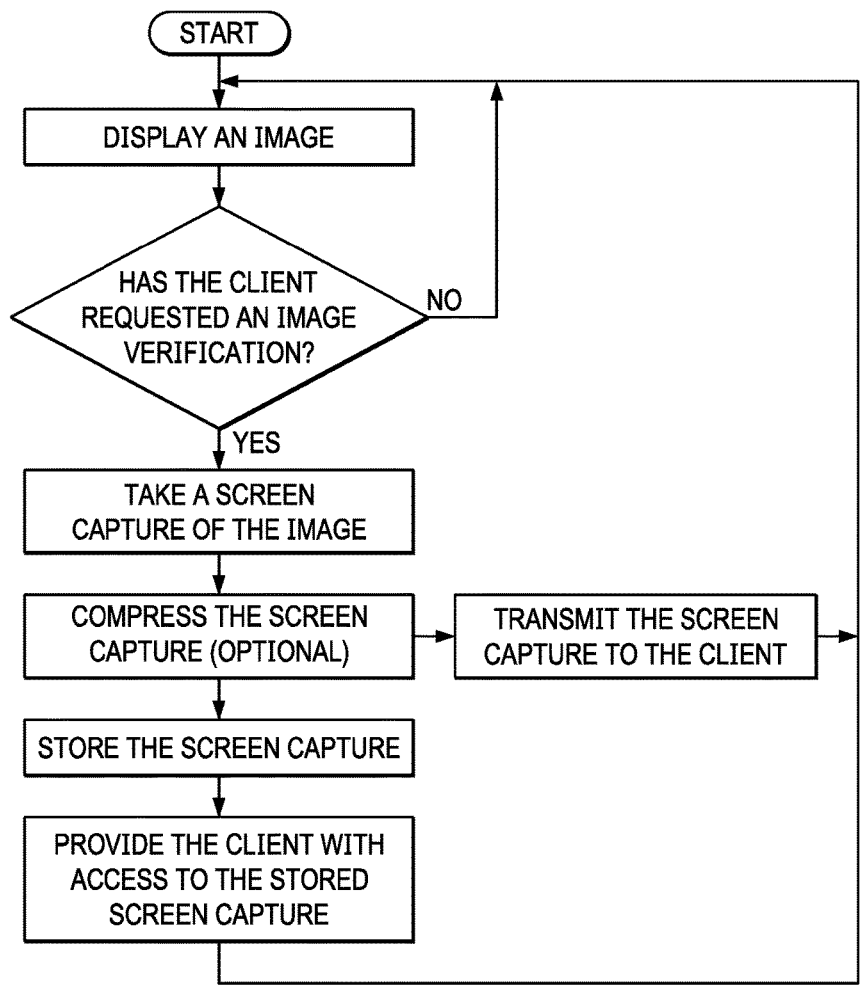
FIG. 4 is an exemplary logical flowchart for operating the display assembly of either FIG. 1 or FIG. 2.

FIG. 4 In an exemplary embodiment, the image validation system 100 or 200 may operate by first displaying an image on the electronic display 102. If the client has not requested an image validation, the image validation system 100 or 200 may continue normal operations. If the client has requested an image validation, the screen capture device 108 may take a screen capture and transmit the screen capture data to the client. Alternatively, the screen capture data can be stored for later access by the client online. In exemplary embodiments, the screen capture device 108 may time and date stamp the screen capture data. The image validation system 100 or 200 may then resume normal operations.

Figure 5:
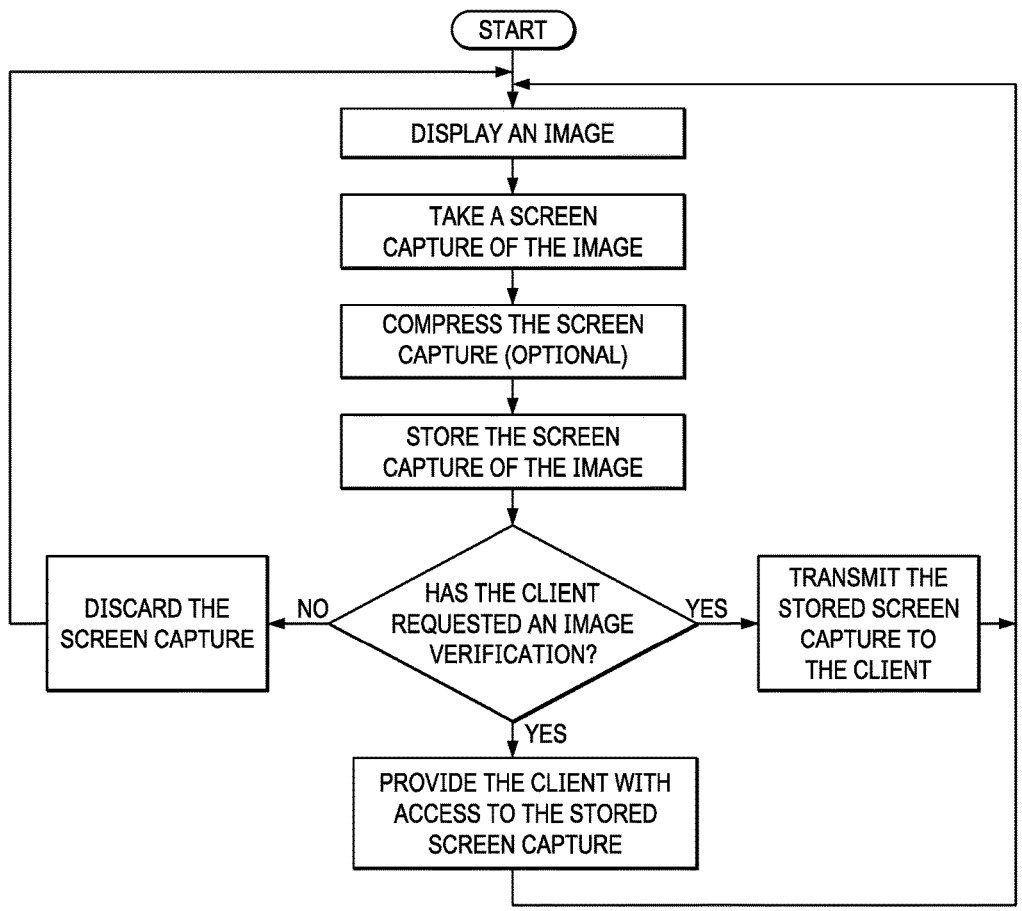
FIG. 5 is another exemplary logical flowchart for operating the display assembly of either FIG. 1 or FIG. 2.

FIG. 5 In another exemplary embodiment, the screen capture device 108 may take a screen capture of every displayed advertising image. The system may store the screen capture data on the electronic storage device 112 or the networked database 120, and if the client requests an image verification, the stored screen capture data can either be transmitted to the client or the client may be provided with access to the stored screen capture data. Alternatively, the system may discard the screen capture data if the client has not requested an image validation. In still other exemplary embodiments, the screen capture device 108 may take a screen capture of every displayed advertising image and the screen capture may be stored for a period of time before being automatically deleted.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

What is claimed is:

1. A system for remote verification of an advertising image shown on an electronic display comprising:
a weather resistant enclosure for the electronic display;
a timing and control board (TCON);
a video player;
a screen capture device in connectivity with the electronic display, the TCON, and the video player, wherein said screen capture device is configured to take a screen capture of the advertising image;
a processor in connectivity with the video player and the screen capture device, wherein said processor is configured to direct the screen capture device to take a screen capture of the advertising image;
an electronic storage device in connectivity with the processor, wherein said electronic storage device is configured to store said screen capture;
a network connection device in connectivity with the processor; and
a networked database located remote from said electronic display and in connectivity with said network connection device, wherein said networked database is configured to receive said screen capture;
wherein the processor is configured to instruct the screen capture device to take the screen capture only when a particular advertising image is scheduled to be displayed on the electronic display.

2. The system of claim 1 wherein:
said networked database and said network connection device are in communication with one another via the internet.

3. The system of claim 1 wherein:
the processor is configured to direct the screen capture device to take screen captures of the advertising images at regular intervals.

4. The system of claim 1 wherein:
said screen capture device is configured to add time and date information to said screen capture.

5. The system of claim 1 wherein:
said processor is configured to direct said screen capture device to take a screen capture of each new advertising image displayed on said electronic display.

6. The system of claim 5 wherein:
and screen capture device is configured to add checksum data to said screen captures; and
said processor is configured to discard screen captures having checksum data that matches the checksum data on an already stored screen capture; and
wherein the advertising images displayed are static advertising images, each of which is displayed for a respective predetermined period of time.

7. The system of claim 1 wherein:
said processor is configured to compress said screen capture.

8. The system of claim 1 wherein:
said processor is configured to reformat said screen capture.

9. The system of claim 1 further comprising:
a user interface configured to permit access to said screen capture stored on the networked database; and
an electronic device in communication with said networked database and configured to display said user interface.

10. The system of claim 9 wherein:
the user interface is a website.

11. A system for remote verification of images shown on an electronic display comprising:
a processor configured to receive image verification requests and direct said video player to display said images on the electronic display, each for a respective predetermined period of time, wherein said images are static digital advertising images;
a screen capture device configured to take screen shots of the images displayed on the electronic display and add checksum data to said screen captures;
a video player configured to receive instructions from said processor and output data regarding said images to said electronic display and said screen capture device;
an electronic storage device in connectivity with said processor and comprising a schedule of when various images are to be displayed on said electronic display, wherein said electronic storage device is configured to store said screen shots;
a network connection device in connectivity with the processor and configured to receive one ore more user requests to take a screen capture of one or more images scheduled for display on the electronic display; and
a networked database located remote from said electronic display and in connectivity with said network connection device, wherein said networked database is configured to receive said screen shots;

wherein said processor is configured to instruct said screen capture device to take a screen shot when an image verification request has been received for the image being currently displayed on the electronic display;

wherein said processor is configured to discard screen captures having checksum data that matches the checksum data on an already stored screen capture;

wherein the processor is configured to instruct the screen capture device to take a screen capture of the image currently being displayed on the electronic display if a user request to take a screen capture has been received for the image currently scheduled for display on the electronic display.

12. The system of claim 11 further comprising:
a user interface configured to permit viewing of said screen shots; and
an electronic device in communication with said networked database and configured to provide access to said user interface.

13. A method for remote verification of an advertising image shown on an electronic display comprising the steps of:
providing a processor in connectivity with the electronic display, a video player, a screen capture device, an electronic storage device comprising a schedule of advertising images to be displayed on said electronic display, a network connection device, and a networked database;
receiving a request, by way of the network connection device, to take a screen capture of one or more advertising images scheduled for display on the electronic display;
instructing the video player to output the advertising image scheduled for display on the electronic display;
instructing the screen capture device to take a screen capture of the advertising image being displayed on the electronic display if a request to take a screen capture has been received for the advertising image currently scheduled for display;
storing the screen capture on the electronic storage device;
transmitting the screen capture to the networked database via the network connection device;
storing the screen capture on the networked database; and
providing access to the screen capture stored on the networked database.

14. The method of claim 13 further comprising the steps of:
providing checksum data on the screen capture;
determining if the checksum data provided on the screen capture matches checksum data provided on any stored screen captures; and
discarding said screen capture if the screen capture comprises checksum data matching the checksum data provided on any already stored screen captures;
wherein the images displayed are static advertising images, each of which is displayed for a respective predetermined period of time.

15. The method of claim 13 further comprising the steps of:
compressing the screen capture.

16. The method of claim 13 wherein:
access to the screen capture stored on the networked database is provided by hosting a website configured to permit access to said networked database.

17. The method of claim 13 wherein:
access to the screen capture stored on the networked database is provided by transmitting a copy of the stored screen capture to a client.

* * * * *